United States Patent
Majumder et al.

(10) Patent No.: US 9,313,109 B1
(45) Date of Patent: Apr. 12, 2016

(54) SYSTEM AND METHOD FOR CONTROLLING NEIGHBOR CELL MONITORING ACTIVITY BASED ON CONDITIONS OF SERVING CELL IN A MOBILE COMMUNICATION DEVICE

(71) Applicant: QUALCOMM Incorporated, San Diego, CA (US)

(72) Inventors: Anindya Majumder, San Diego, CA (US); Farrukh Rashid, Farnborough (GB); Divaydeep Sikri, Woking (GB); Jafar Mohseni, San Diego, CA (US); Krishna Rao Mandadapu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/689,536

(22) Filed: Apr. 17, 2015

(51) Int. Cl.
*H04W 4/00* (2009.01)
*H04L 12/26* (2006.01)
*H04B 17/318* (2015.01)

(52) U.S. Cl.
CPC .............. *H04L 43/02* (2013.01); *H04B 17/318* (2015.01); *H04L 43/16* (2013.01)

(58) Field of Classification Search
CPC ....... H04L 43/02; H04L 43/16; H04B 17/318
USPC ....................................................... 455/422.1
See application file for complete search history.

(56) References Cited

U.S. PATENT DOCUMENTS

| | | | |
|---|---|---|---|
| 7,676,214 B2 | 3/2010 | Homchaudhuri | |
| 8,761,788 B2 | 6/2014 | Rajurkar et al. | |
| 2007/0223510 A1* | 9/2007 | Joo | H04W 36/0088 370/436 |
| 2011/0171962 A1* | 7/2011 | Iwamura | H04J 11/0093 455/437 |
| 2012/0315890 A1* | 12/2012 | Suzuki | H04W 24/10 455/422.1 |
| 2013/0203419 A1* | 8/2013 | Siomina | H04W 36/18 455/437 |
| 2013/0244673 A1 | 9/2013 | Anand et al. | |
| 2014/0064113 A1 | 3/2014 | Burhan et al. | |
| 2014/0119345 A1 | 5/2014 | Sikri et al. | |
| 2014/0295831 A1 | 10/2014 | Karra et al. | |

FOREIGN PATENT DOCUMENTS

WO      2014144192      9/2014

* cited by examiner

*Primary Examiner* — Don N Vo
(74) *Attorney, Agent, or Firm* — The Marbury Law Group, PLLC

(57) ABSTRACT

Embodiments are provided herein for reducing neighbor cell monitoring by a mobile communication device that may include measuring a channel condition of the cell serving the idle network subscription, determining whether the measured channel condition of the cell serving the idle network subscription satisfies a threshold value, and in response to determining that the measured channel condition of the cell serving the idle network subscription satisfies the threshold value, reducing a frequency at which neighbor cells associated with the idle network subscription are monitored and monitoring the neighbor cells associated with the idle network subscription according to the reduced frequency.

30 Claims, 9 Drawing Sheets

SYSTEM AND METHOD FOR CONTROLLING NEIGHBOR CELL MONITORING ACTIVITY BASED ON CONDITIONS OF SERVING CELL IN A MOBILE COMMUNICATION DEVICE

BACKGROUND

Cellular and wireless communication devices have seen explosive growth over the past several years. This growth has been fueled by better communications hardware, larger networks, and more reliable protocols. Today's smartphones include cameras, Global Positioning System (GPS) receivers, Bluetooth® transceivers, and of course the cellular communication capabilities (e.g., Long Term Evolution (LTE), 3G and/or 4G network access) to enable the mobile communication devices to establish data communication links with the Internet. Smartphones are now very widely deployed in society. Additionally, the components and capabilities in smartphones are now very affordable, enabling the capabilities to be deployed in other types of devices.

Many networks have been deployed to support these mobile communication devices. A wireless network may be distributed over land areas called cells. Each cell typically includes a base station or other access point that is capable of providing voice and/or data services to mobile communication devices having a subscription to that network. Each cell is generally surrounded by a number of neighbor cells. A mobile communication device selects and establishes a connection with a local cell as the serving cell for making and receiving voice calls on the wireless network subscription. The mobile communication device may periodically monitor the neighbor cells to determine whether there is a better cell available for making and receiving calls on the wireless network subscription. If so, the mobile communication device may reselect the serving cell to be the best available neighbor cell.

Mobile communication devices may include one or more network interfaces for accessing one or more respective network subscriptions. For example, a mobile communication device may be configured with a single subscriber identity module (SIM) card or multiple SIM cards that access or share access to a receiver/transmitter chain (i.e., the circuitry associated with the radio between the antenna and the modem). A mobile communication device may operate the network supporting one or more subscriptions in one of several modes, including an "active" mode and an "idle" mode. The mobile communication device generally performs neighbor cell monitoring on idle network subscriptions.

For example, a conventional single SIM mobile communication device operating in idle mode periodically "wakes up" and enables power to the receiver and other components to listen for paging messages over the paging channel of the idle subscription's serving cell. During this wake up period, the single SIM device also monitors neighbor cells that surround the current serving cell. As described, the single SIM device monitors neighbor cells to determine whether there is a better neighbor cell available for making and receiving calls on a network subscription. If so, the single SIM device may reselect the serving cell to be the best available neighbor cell. For example, in Global System for Mobile Communications (GSM) networks, the single SIM device may be aware of 32 neighbor cells that surround the serving cell of an idle network subscription. Neighbor cell monitoring may include the single SIM device monitoring the transmit signal power of the neighbor cells to determine the top neighbor cells, typically the top six. Neighbor cell monitoring may also include decoding certain control channels of the top neighbor cells, such as Synchronization Channel (SCH), Frequency Correction Channel (FCCH), and Broadcast Control Channel (BCCH) of a GSM network. By decoding such control channels of the top neighbor cells in advance, the single SIM device may identify and synchronize to a neighbor cell more quickly during a reselection. Once wake up processing is complete, the single SIM device may reenter a low power state and wait until the next wake up time. Such conventional monitoring of neighbor cells, however, reduces the standby time of the mobile device and consumes a significant amount of power.

In another example, a mobile communication device may be configured with two or more SIM cards sharing a single receiver/transceiver chain (e.g., a dual SIM dual standby "DSDS"). In such multi-SIM multi-standby (MSMS) devices, the receiver/transmitter chain tunes to a single network subscription one at a time, and therefore the two or more SIM interfaces cannot operate simultaneously. Thus, a MSMS device may monitor multiple interfaces in an idle mode by tuning to one network subscription and then to another network subscription. For example, the radio may connect to a first network subscription and periodically tune away to other idle network subscriptions to maintain service with those networks. The time that the mobile device tunes away from the first subscription to the idle subscription is typically aligned with the wake up time of the idle subscription. In this way, the conventional tune away procedure allows a MSMS device to listen for pages and perform neighbor cell monitoring on idle subscriptions. However, tuning away to an idle subscription typically interrupts data transmissions to and from an active subscription. Therefore, in MSMS devices, conventional monitoring of neighbor cells can reduce throughput of data transmitted to and received from the active network subscription. Such reduced throughput may be due to the mobile communication device pausing data communication on the active subscription for the duration that the MSMS device is tuned away to the idle network subscription.

SUMMARY

The various embodiments provide methods, devices, and systems that enable a mobile communication device to control neighbor cell monitoring activity on an idle network subscription. In response to the mobile communication device determining that a channel condition of the cell serving the idle network subscription satisfies a threshold, the mobile communication device may be configured to reduce monitoring activities on neighbor cells. In other words, when the strength and/or quality of the signals received from the cell serving the idle network subscription meet certain thresholds, the likelihood that reselection is necessary is not as high. Thus, the frequency at which neighbor cells are monitored for identifying candidates for cell reselection may be reduced. Benefits of controlling neighbor cell monitoring activity on idle subscriptions in this manner may include improvements in overall power consumption of mobile communication devices and/or, in the case of MSMS devices, improvements in data throughput on an active network subscription. In the event the mobile communication device subsequently determines that the channel condition of the cell serving the idle network subscription fails to satisfy the threshold, the mobile communication device may be configured to restore the default frequency at which neighbor cell monitoring activities are performed.

Embodiment methods for reducing neighbor cell monitoring by a mobile communication device may include a processor of the mobile communication device measuring a channel condition of the cell serving the idle network subscription, determining whether the measured channel condition of the cell serving the idle network subscription satisfies a threshold value, and in response to determining that the channel condition of the cell serving the idle network subscription satisfies the threshold value, reducing a frequency at which neighbor cells associated with the idle network subscription are monitored and monitoring the neighbor cells associated with the idle network subscription according to the reduced frequency.

In some embodiments, reducing a frequency at which the neighbor cells are monitored may include the processor setting a parameter value in memory that increases an interval between successive monitoring of the neighbor cells. In some embodiments, reducing a frequency at which the neighbor cells are monitored may include the processor setting a parameter value in memory that reduces a default number of neighbor cells to periodically monitor.

In some embodiments, the method may further include the processor determining whether the measured channel condition of the cell serving the idle network subscription satisfies the threshold value for a consecutive number of times that the channel condition is measured. In some embodiments, measuring a channel condition of the cell serving the idle network subscription may include the processor measuring the channel condition on a paging channel of the cell serving the idle network subscription, the channel condition may include at least one of a signal-to-noise ratio value and a receive signal strength indicator value. In some embodiments, the method may further include, in response to determining that the channel condition fails to satisfy the threshold value, the processor restoring the frequency at which the neighbor cells are monitored and monitoring the neighbor cells associated with the idle network subscription according to the restored frequency.

In some embodiments, the mobile communication device may be a multi-SIM multi-standby mobile communication device and the method may further include the processor periodically tuning away a receiver from a first wireless network subscription to the idle network subscription for a tune away period. The method may further include the processor reducing a duration of the tune away period by an amount of time corresponding to the reduced frequency at which the neighbor cells are monitored.

In some embodiments, the mobile communication device may be a single SIM mobile communication device and the method may further include the processor periodically tuning a receiver to the idle network subscription for a wake up period. The method may further include the processor reducing a duration of the wake up period by an amount of time corresponding to the reduced frequency at which the neighbor cells are monitored.

Further embodiments include a mobile communication device including a processor configured with processor-executable instructions to perform operations of the embodiment methods described above. Further embodiments include a non-transitory processor-readable storage medium having stored thereon processor-executable instructions configured to cause a processor to perform operations of the embodiment methods described above. Further embodiments include a mobile communication device that includes means for performing functions of the operations of the embodiment methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
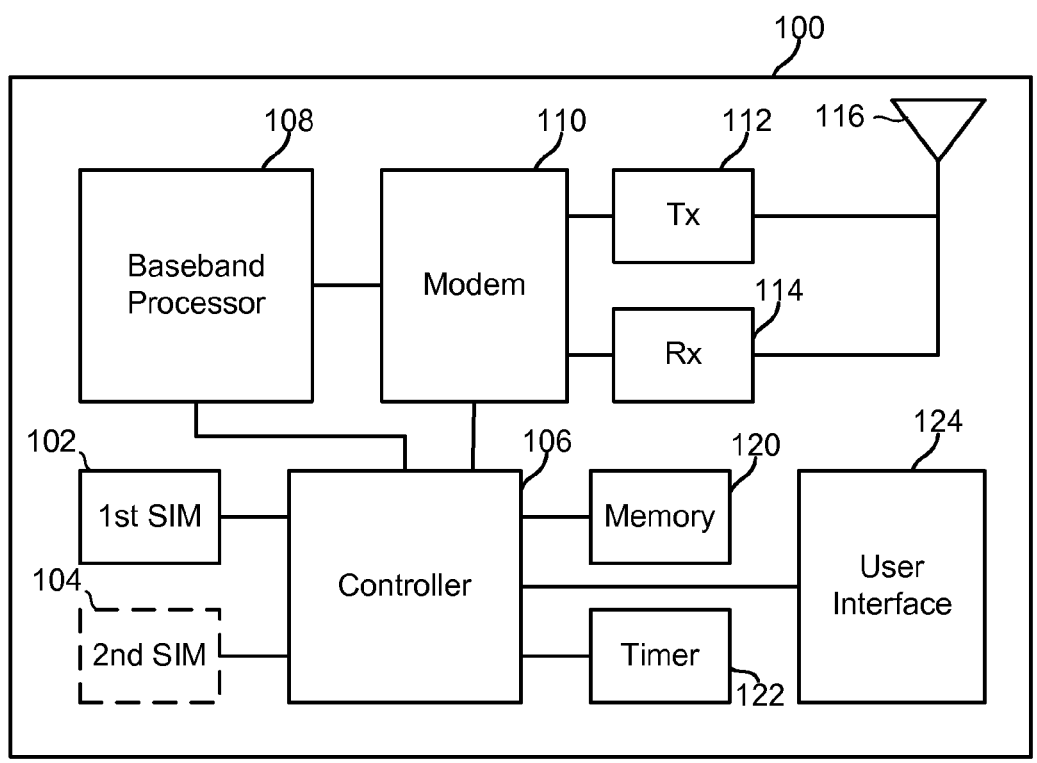
FIG. 1 is a component block diagram of a mobile communication device 100 having one or more network interfaces that may be used in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The various embodiments provide systems, devices, and methods that enable a mobile communication device to manage the frequency of monitoring the channel conditions of neighbor cells on an idle network subscription based on measured channel conditions of the cell serving the idle network (the "serving cell").

The word "exemplary" is used herein to mean "serving as an example, instance, or illustration." Any implementation described herein as "exemplary" is not necessarily to be construed as preferred or advantageous over other implementations.

The terms "mobile communication device," "mobile communication device," and "computing device" are used interchangeably herein to refer to any one or all of cellular telephones, smartphones, personal or mobile multi-media players, personal data assistants (PDAs), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., CDMAOne, CDMA2000), enhanced data rates for GSM evolution (EDGE), advanced mobile communication device system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iDEN), and/or the like. Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments provide systems, devices, and methods that enable a mobile communication device to control neighbor cell monitoring activity on an idle network subscription. In response to the mobile communication device determining that a channel condition of the cell serving the idle network subscription (the serving cell) satisfies a threshold, the mobile communication device may be configured to reduce monitoring activities on neighbor cells. In other words, when the strength and/or quality of the signals received from the cell serving the idle network subscription meet certain thresholds, the likelihood that reselection is necessary is not as high. Thus, the frequency at which neighbor cells are monitored for identifying candidates for cell reselection may be reduced. Benefits of controlling neighbor cell monitoring activity on idle subscriptions in this manner may include improvements in overall power consumption of mobile communication devices and/or, in the case of MSMS devices, improvements in data throughput on an active network subscription. In the event the mobile communication device subsequently determines that the channel condition of the cell serving the idle network subscription fails to satisfy the threshold, the mobile communication device may be configured to restore the default frequency at which neighbor cell monitoring activities are performed.

FIG. 1 is a component block diagram of a mobile communication device 100 having one or more network interfaces that may be used in various embodiments. For example, as shown, the mobile communication device 100 may include a single radio frequency (RF) chain with a baseband processor 108 connected to a modem 110. The modem 110 may be connected to a transmitter 112 and a receiver 114. The transmitter 112 and receiver 114 may each be connected to an antenna 116. Although the transmitter 112 and receiver 114 are shown as separate components in FIG. 1, alternate embodiments may include a transceiver capable of both transmitting and receiving signals.

The transmitter 112 and the receiver 114 (or alternately, the transmitter and receiver portions of a transceiver) may be configured to be tuned separately. For example, the transmitter 112 may be separately tuned to transmit on a first frequency or frequency band while the receiver 114 is tuned to receive a second frequency or frequency band. In another example, the transmitter 112 and the receiver 114 may be tuned to the same frequency or frequency band and then the receiver 114 may be tuned to a second frequency or frequency band while the transmitter 112 remains tuned to the first frequency or frequency band. The transmitter 112 and the receiver 114 (or alternately, the transmitter and receiver portions of a transceiver) may be configured to be tuned together. For example, the transmitter 112 and the receiver 114 may be tuned to the same frequency or frequency band of a first wireless network subscription and then tuned together to a second frequency or frequency band of a second network subscription.

In some embodiments, the transmitter 112 and the receiver 114 may be configured to operate with different network technologies, such as operating with different spectrum masks, modulated waveforms, frequency accuracy for the transmitter and sensitivity, adjacent channel selectivity, and/or spurious response for the receiver.

The modem 110 and the baseband processor 108 may be connected to a controller 106, such as a processor or microcontroller. The controller 106 may also be connected to one or more memories, such as memory 120, and one or more timers, such as timer 122. The controller 106 may be connected to one or more input or output devices, such as a user interface 124 which may include devices such as one or more buttons, touchscreens, displays, speakers, and/or microphones. The controller 106 may also be connected to one or more network interfaces. For example, in a single SIM device, the controller 106 may be connected to a first SIM 102. In a dual SIM device, the controller 106 may be connected to the first SIM 102 and a second SIM 104. Further embodiments may include any number of network interfaces.

Each of the first and second network interfaces (e.g., the first SIM 102 and the second SIM 104) may include various types of interfaces configured to authorize or authenticate a connection with a network subscription. Each interface may correspond to one or more separate network subscriptions or networking technologies or to different accounts on the same network subscription. For example, in various embodiments the first network interface may connect to a data network subscription while the second network interface may connect to a voice network subscription.

In various embodiments, each network interface may be SIM hardware, memory, or card that stores one or more encoded values that uniquely identify the SIM, such as an International Mobile Subscriber Identity (IMSI), as well as one or more keys or codes used for authentication. The SIM may also store one or more encoded values that identify a home network subscription, an account with a network subscription, and/or the current network subscription to which the mobile communication device is connected.

In a mobile communication device having multiple network interfaces, one of the network interfaces 102, 104 may be used to connect with a first network subscription. As an example, when the mobile communication device 100 is powered on, the modem 110 may scan the available wireless networks to determine whether a connection through the first network subscription is available. The mobile communication device 100 may compare encoded values stored on the first or second network interfaces 102, 104 to one or more values received from the first network subscription and establish a connection if there is a match. Once a connection is established, the mobile communication device 100 may communicate with the first network subscription, such as exchanging voice or data calls. Furthermore, the mobile communication device 100 may monitor one or more additional network subscriptions, such as a second network subscription corresponding to the second network interface 104, in a process called tune away. If the mobile communication device 100 has a single RF chain, the mobile communication device may send and receive data with one network subscription at a time. The mobile communication device may be communicating with the first network subscription, tune away or retune the transmitter 112 and the receiver 114 to the second network subscription, and then tune back to the first network subscription.

In a mobile communication device having a single network interface, the mobile communication device may connect with a single network subscription over the single network interface, e.g., first SIM 102. In such embodiments, the second SIM 104 is represented with dotted lines to represent a mobile communication device being configured with a single network interface, namely the first SIM 102. Once a connection is established, the mobile communication device 100 may operate the network subscription in several modes, including active and idle modes.

Figure 2A:
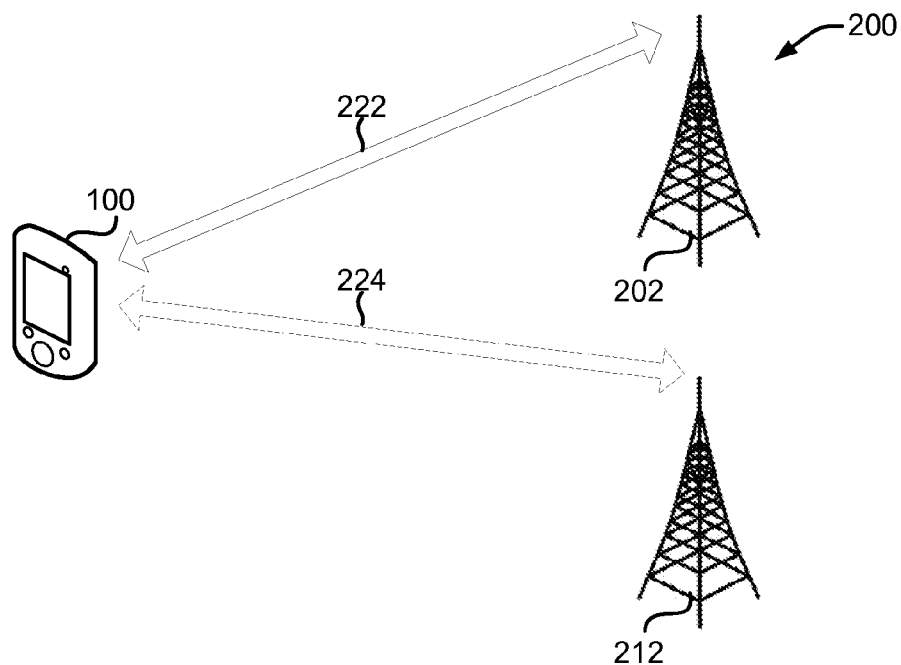
FIGS. 2A and 2B illustrate wireless communication systems implementing tune away methods that may be used in various embodiments involving a mobile communication device having multiple network interfaces.
Figure 2B:
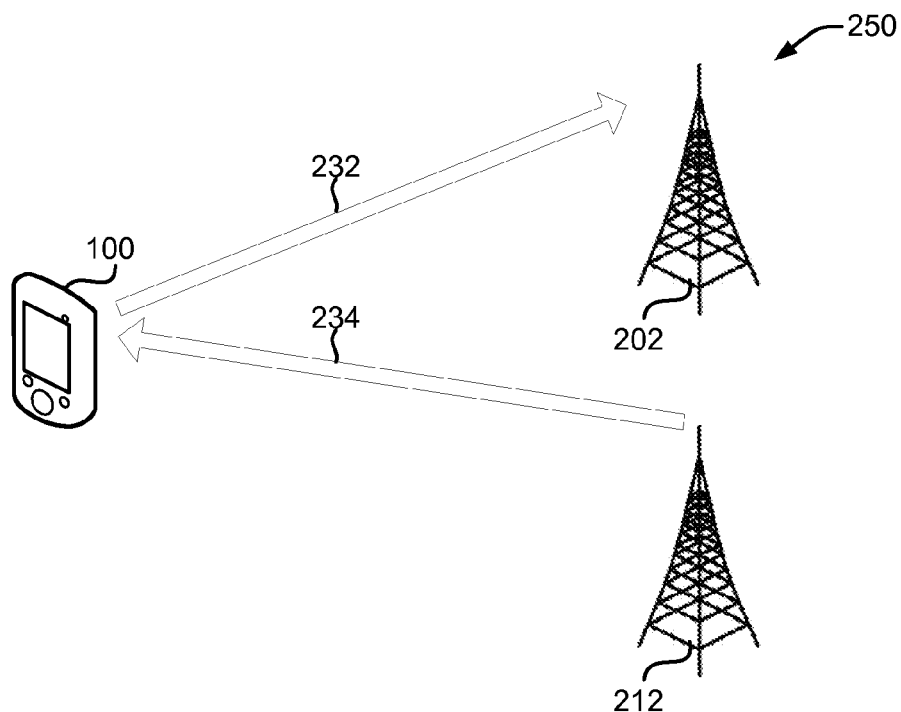

FIGS. 2A and 2B illustrate wireless communication systems 200 and 250, respectively, implementing tune away methods that may be used in various embodiments involving a mobile communication device having multiple network interfaces. With reference to FIGS. 1-2B, in the system 200, a tune away method is implemented in which the transmitter 112 and the receiver 114 are tuned together. The mobile communication device 100 may establish a first connection 222 with a first network subscription, represented in the system 200 by the first base station 202. The first connection 222 may operate in both directions (i.e., full duplex) allowing the mobile communication device 100 to send and receive signals when both the transmitter 112 and the receiver 114 are tuned to the first network subscription. The mobile communication device 100 may tune away to a second network subscription represented by the second base station 212 to form a second connection 224. The second connection 224 may not be a formal connection (e.g., it may not involve a setup period such as exchanging synchronization messages with the second network subscription). Instead, the mobile communication device 100 may simply retune the transmitter 112 and the receiver 114 from the first network subscription to the second network subscription in order to receive or transmit. The second connection 224 with the second base station 212 is illustrated as a dotted line because the connection does not exist simultaneously with the first connection 222.

In the system 250, a receiver-only tune away is implemented in which the receiver 114 is tuned away while the transmitter 112 remains tuned to the original network subscription. For example, the mobile communication device 100 may be connected to a first network subscription via a first connection 232 in a first state. The mobile communication device 100 may enter a second state, such as illustrated in the system 250, in which the transmitter 112 remains tuned to the first network subscription (as indicated by the communication link 232 in a single direction going to the base station 202 from the mobile communication device 100) while the receiver 114 is tuned to a second network subscription (as indicated by communication link 234 in a single direction going to the mobile communication device 100 from the base station 212). In this second state, the mobile communication device 100 may receive signals, such as paging signals, from the second network subscription while still transmitting to the first network subscription. The mobile communication device 100 may return to the first state (i.e., tune the receiver 114 back the first network subscription) after a tune away period ends, such as in response to no paging signal or other signal being received from the second network subscription.

Figure 3A:
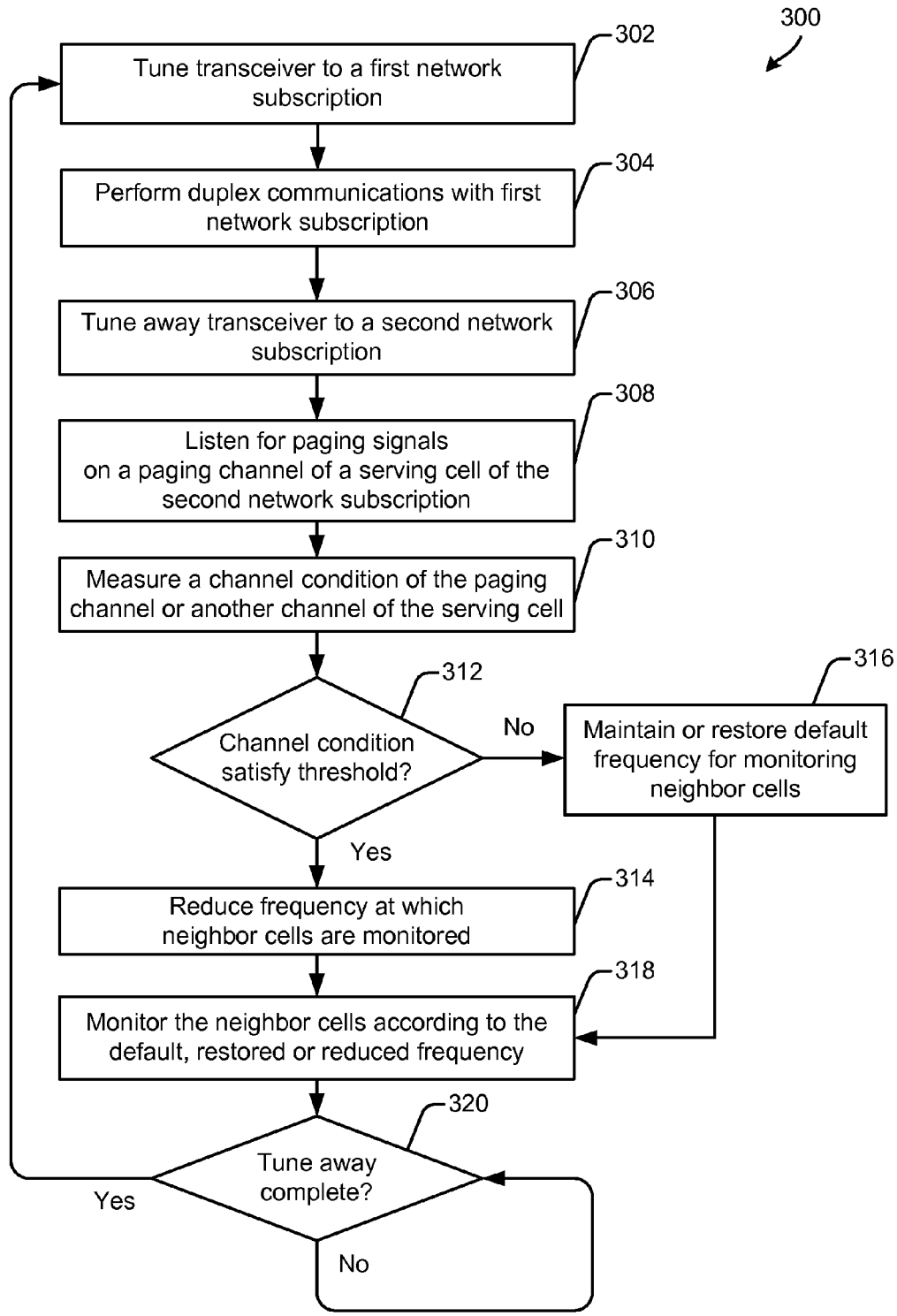
FIG. 3A is a process flow diagram of a method 300 that enables a multi-SIM, multi-standby mobile communication device to control neighbor cell monitoring activity on an idle network subscription during tune away according to an embodiment.

FIG. 3A is a process flow diagram of a method 300 that enables a multi-SIM, multi-standby mobile communication device to control neighbor cell monitoring activity on an idle network subscription during tune away according to an embodiment. The method 300 may be performed by a processor of the multi-SIM, multi-standby mobile communication device (e.g., the baseband processor 108 or the controller 106 of FIG. 1).

With reference to FIGS. 1-3A, in block 302, a processor of the mobile communication device (e.g., 100) may tune the transmitter (e.g., 112) and the receiver (e.g., 114) (or alternately, the transmitter and receiver portions of a transceiver) to a first wireless network subscription. For example, the first wireless network subscription may be a subscription to a LTE data network. Other wireless data networks may employ WCDMA, TD-CDMA, and EDGE technologies, for example.

In block 304, the mobile communication device may perform full-duplex communications with the first network subscription, such as establishing a connection and transferring voice or data signals between the mobile communication device and the first network subscription. For example, the first network subscription may be configured in connected mode engaged in a packet transfer activity (i.e., receiving and/or transmitting data packets on the wireless subscription).

In block 306, the processor of the mobile communication device may tune away the transmitter and the receiver to a frequency or range of frequencies corresponding to a second network subscription as illustrated in the system 200. Alternatively, the processor of the mobile communication device may tune away only the receiver (or the receiver portion of a transceiver) to the second network subscription as illustrated in the system 250. The processor may time the tune away to match anticipated signals from the second network subscription. For example, the mobile communication device may tune away the receiver to the second network when a paging signal period is scheduled. During the receiver-only tune away, the transmitter may remain tuned to the first network to continue transmitting or may stop transmitting. The second wireless network subscription may be a subscription to a GSM network, for example.

In block 308, the processor of the mobile communication device may monitor for signals from the second network subscription. For example, the mobile communication device may listen for paging signals indicating an incoming call or a request to connect to transfer data. The processor may listen for paging signals by decoding a paging channel (PCH) of the cell serving the idle network subscription, which is the cell on which the mobile communication device is camped (also referred to as the serving cell). In response to receiving a paging signal, the processor may tune the transmitter to the second network subscription and proceed to respond to the paging signal to take a call. Alternately, the processor may prompt a user for a decision regarding whether to respond to the paging signal or request to connect.

In block 310, the processor may measure one or more channel conditions of the paging channel of the cell serving the idle network subscription. The channel condition may be a receive signal strength indicator (RSSI), signal-to-noise ratio (SNR), or other indicators of signal strength or signal quality associated with the serving cell. The channel condition may also be measured on a different channel provided by the serving cell, such as Broadcast Control Channel (BCCH).

In determining block 312, the processor of the mobile communication device determines whether the channel condition of the cell serving the idle network subscription satisfies a threshold value. For example, the processor may determine whether the receive signal strength indicator measured on the serving cell's paging channel (PCH) equals or exceeds a RSSI threshold of −75 dBm (decibels-milliwatts) or other suitable value. As another example, the processor may determine whether the signal-to-noise ratio measured on the serving cell's paging channel equals or exceeds a SNR of 16 dB or other suitable value. In some embodiments, in determination block 312, the processor of the mobile communication device may determine whether the channel conditions satisfy the threshold for a number of consecutive measurements made during successive tune aways before determining that the channel condition threshold is satisfied reducing the frequency at which neighbor cells are monitored in block 314. For example, the process may maintain the default frequency at which neighbor cells are monitored unless the measured channel condition of the serving cell satisfies the threshold for consecutive measurements made over a period of 3 to 5 tune aways. In contrast, some embodiments may not require such a time threshold for determining whether to restore the default frequency at which neighbor cells are ordinarily monitored in block 316. For example, in the event the channel condition of the cell serving the idle network subscription fails to satisfy the threshold, the mobile communication device may be configured to restore the default frequency of neighbor cell monitoring in block 316 without further confirmatory measurements.

In response to determining that the channel condition of the cell serving the idle network subscription fails to satisfy the threshold value (i.e., determination block 312="No"), the processor may maintain or restore the default frequency at which the neighbor cells are monitored in block 316. For example, the threshold RSSI or SNR channel condition for initially reducing the frequency of neighbor cell monitoring may be lower than the threshold channel condition for restoring the default frequency ordinarily used.

In block 316, the processor of the mobile communication device may maintain or restore the default frequency at which the neighbor cells are monitored. In some embodiments, the default frequency at which the neighbor cells are monitored may be restored by the processor of the mobile communication device restoring the original number of neighbor cells to select for monitoring during each tune away (e.g., the top (6) neighbor cells). In some embodiments, the default frequency at which the neighbor cells are monitored may be restored by setting the parameter that represents an interval between successive monitoring of the neighbor cells back to a default value. For example, the default parameter value may specify an interval in which neighbor call monitoring is performed for all neighbor cells at every tune away. By restoring the default frequency, the duration of each tune away period may also be restored to a default length of time.

In response to determining that the channel condition of the cell serving the idle network subscription satisfies the threshold value (i.e., determination block 312="Yes"), the processor may reduce the frequency at which the neighbor cells are monitored in block 314. In some embodiments, the frequency at which the neighbor cells are monitored may be reduced by the processor of the mobile communication device selecting a subset of neighbor cells to monitor during each tune away. For example, instead of monitoring the control channels of the top six (6) neighbor cells (e.g., SCH, BCCH, FCCH in a GSM network subscription), the processor of the mobile communication device may select two (2) or three (3) of the top six (6) neighbor cells to monitor during any one tune away. In some embodiments, selecting a subset of neighbor cells to monitor during each tune away may include setting a parameter value in the memory that reduces a default number of neighbor cells to periodically monitor, e.g., from six to two.

The frequency at which the neighbor cells are monitored may be reduced in block 314, in some embodiments, by setting a parameter value in the memory (e.g., 120) that increases an interval between successive monitoring of the neighbor cells. For example, a parameter may be set in the memory to reduce successive monitoring of neighbor cells from a default interval of every 30 seconds to a reduced interval of every 60 seconds.

In block 318, the multi-SIM multi-standby mobile communication device may monitor neighbor cells according to the default frequency or the reduced frequency set in block 314. Neighbor cell monitoring may include the processor of the mobile communication device monitoring the transmit signal power of the neighbor cells to determine the top neighbor cells. Neighbor cell monitoring may also include decoding certain control channels of the top neighbor cells, such as the SCH, BCCH, and FCCH control channels of a GSM network subscription. By decoding such control channels of the top neighbor cells in advance, the mobile communication device may identify and synchronize to a neighbor cell more quickly during a reselection.

Thus, in response to the mobile communication device determining that a channel condition of the serving cell for the idle network subscription satisfies a threshold, the mobile communication device may reduce monitoring activities on neighbor cells. In other words, where the strength and/or quality of the signals received from the serving cell meet certain thresholds, the likelihood that reselection is necessary is not as high. Thus, the frequency at which neighbor cells are monitored for identifying candidates for cell reselection may be reduced. A benefit of such reduced neighbor cell monitoring activity may include improvements in data throughput on a first network subscription in an active packet transfer mode. In the event the mobile communication device subsequently determines that the channel condition of the serving cell fails to satisfy the threshold, the mobile communication device may restore the default frequency at which neighbor cell monitoring activities are performed.

In determination block 320, the processor of the mobile communication device may determine whether the tune away operations have been completed or whether a timer associated with the tune away has expired. In response to determining that the tune away has competed, the mobile communication device may tune the transmitter and receiver (or alternately, the transmitter and receiver portions of a transceiver) back to the first wireless network subscription in block 302.

Figure 3B:
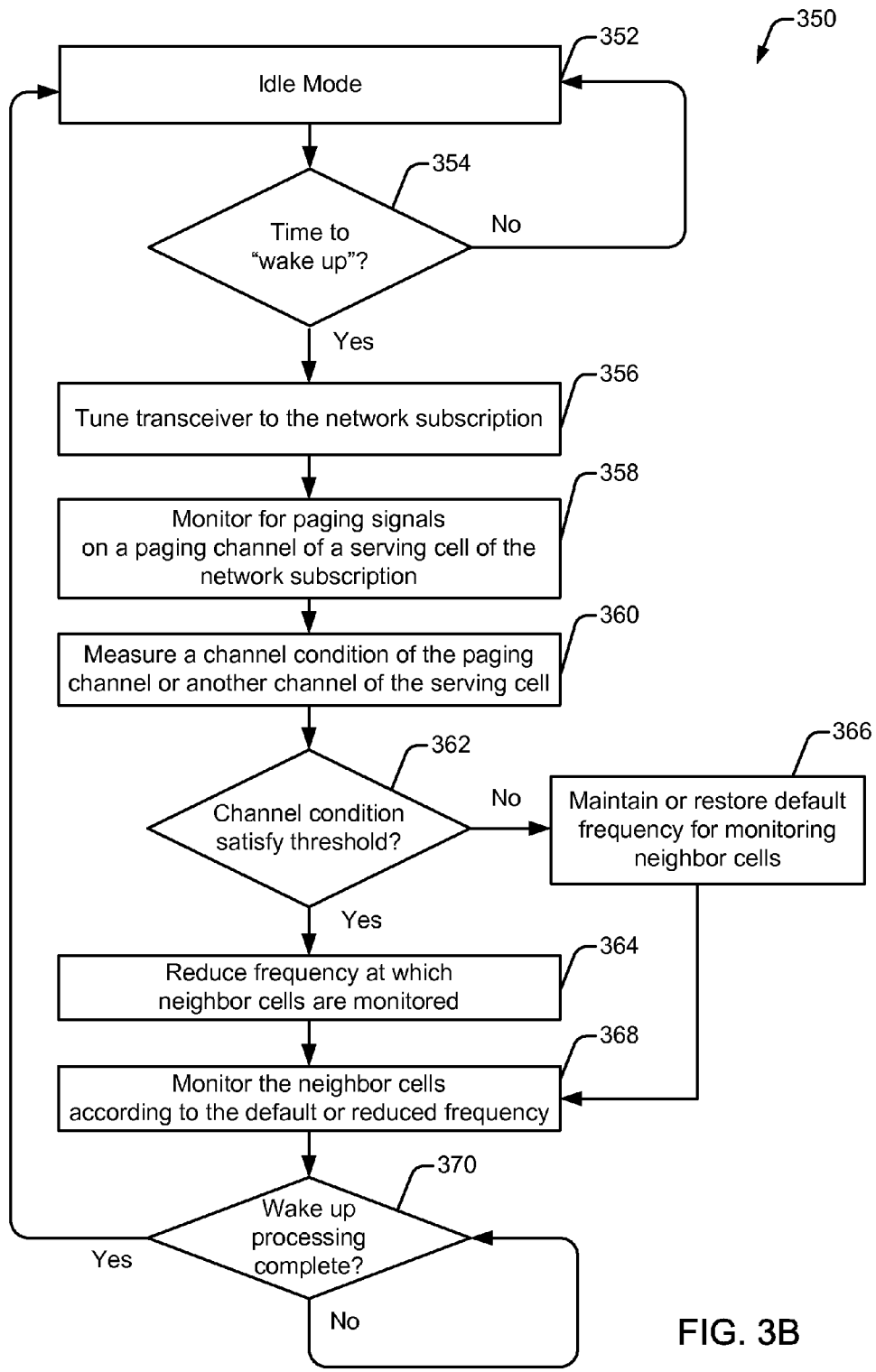
FIG. 3B is a process flow diagram of a method that enables a single SIM mobile communication device to control neighbor cell monitoring activity on an idle network subscription during wake up according to various embodiments.

FIG. 3B is a process flow diagram of a method 350 that enables a single SIM mobile communication device to control neighbor cell monitoring activity on an idle network subscription during wake up according to various embodiments. The method 350 may be performed by a processor of the single SIM mobile communication device (e.g., the baseband processor 108 or the controller 106 of FIG. 1).

With reference to FIGS. 1-3B, in block 352, the single SIM mobile communication device (e.g., 100) operates in an idle mode. In the idle mode, a processor of the mobile communication device may reduce, if not disable, power to certain components of the mobile communication device, including the transmitter (e.g., 112) and the receiver (e.g., 114) (or alternately, the transmitter and receiver portions of a transceiver).

In determination block 354, the processor of the mobile communication device may determine whether the time to "wake up" the receiver to listen for paging messages over the paging channel of the idle subscription's serving cell has been reached. The wake up time is typically aligned to match anticipated signals from the network subscription associated with the mobile communication device. For example, the mobile communication device may be scheduled to wake up and enable power to the receiver for tuning to the idle network when a paging signal period is scheduled. In response to determining that the wake up time is not yet reached (i.e., determination block 354="No"), the mobile communication device remains in a low power standby state in block 352.

In response to determining that the wake up time is reached (i.e., determination block 354="Yes"), the processor of the mobile communication device may enable power to the transmitter and the receiver (or alternately, the transmitter and receiver portions of a transceiver) for tuning to the wireless network subscription operating in idle mode in block 356. The idle subscription may be a subscription to a GSM network, for example.

In block 358, the processor of the mobile communication device may monitor for signals from the idle network subscription. For example, the processor may listen for paging signals indicating an incoming call or a request to connect to transfer data. The processor may listen for paging signals by decoding a paging channel (PCH) of the serving cell on which the mobile communication device is camped. In response to receiving a paging signal, the processor may proceed to respond to the paging signal to take a call. Alternately, the processor may prompt a user for a decision regarding whether to respond to the paging signal or request to connect.

In block 360, the processor may measure one or more channel conditions of the paging channel of the serving cell. The channel condition may be a receive signal strength indicator (RSSI), a signal-to-noise ratio (SNR), or other indicators of signal strength or signal quality associated with the serving cell. The channel condition may also be measured on a different channel provided by the serving cell, such as Broadcast Control Channel (BCCH).

In determination block 362, the processor of the mobile communication device may determine whether the channel condition satisfies a threshold value. For example, the processor may determine whether the receive signal strength indicator measured on the serving cell's paging channel (PCH) equals or exceeds a RSSI threshold of −75 dBm (decibels-milliwatts) or other suitable value. As another example, the processor may determine whether the signal-to-noise ratio measured on the serving cell's paging channel equals or exceeds a SNR of 16 dB or other suitable value. In some embodiments, in determination block 362, the processor of the mobile communication device may determine whether the channel conditions satisfy the threshold for a number of consecutive measurements made during successive wake ups before determining that the channel condition threshold is satisfied before reducing the frequency at which neighbor cells are monitored in block 364. For example, the process may maintain the default frequency at which neighbor cells are monitored unless the measured channel condition of the serving cell satisfies the threshold for consecutive measurements made over a period of 3 to 5 wake ups. In contrast, some embodiments may not require such a time threshold for determining whether to restore the default frequency at which neighbor cells are ordinarily monitored in block 366. For example, in the event the channel condition fails to satisfy the threshold, the mobile communication device may be configured to restore the default frequency of neighbor cell monitoring in block 366 without further confirmatory measurements.

In response to determining that the channel condition of the serving cell fails to satisfy the threshold value (i.e., determination block 362="No"), the processor may maintain or restore the default frequency at which the neighbor cells are monitored in block 366. For example, the threshold RSSI or SNR channel condition for initially reducing the frequency of neighbor cell monitoring may be lower than the threshold channel condition for restoring the default frequency ordinarily used.

In response to determining that the channel condition of the serving cell satisfies the threshold value (i.e., determination block 362="Yes"), the processor may reduce the frequency at which the neighbor cells are monitored in block 364. In some embodiments, the frequency at which the neighbor cells are monitored may be reduced by the processor of the mobile communication device selecting a subset of neighbor cells to monitor during each wake up. For example, instead of monitoring the control channels of the top six (6) neighbor cells (e.g., SCH, BCCH, FCCH in a GSM network subscription), the processor of the mobile communication device may select two (2) or three (3) of the top six (6) neighbor cells to monitor during any one tune away. In some embodiments, selecting a subset of neighbor cells to monitor during each tune away may include setting a parameter value in the memory that reduces a default number of neighbor cells to periodically monitor, e.g., from six to two.

The frequency at which the neighbor cells are monitored may be reduced in block 364 in some embodiments by setting a parameter value in the memory that increases an interval between successive monitoring of the neighbor cells. For example, a parameter may be set in the memory to reduce successive monitoring of neighbor cells from a default interval of every 30 seconds to a reduced interval of every 60 seconds.

In block 366, the processor of the mobile communication device may maintain or restore the default frequency at which the neighbor cells are monitored. In some embodiments, the default frequency at which the neighbor cells are monitored may be restored by the processor of the mobile communication device restoring the original number of neighbor cells to select for monitoring during each tune away (e.g., the top (6) neighbor cells). In some embodiments, the default frequency at which the neighbor cells are monitored may be restored by setting the parameter that represents an interval between successive monitoring of the neighbor cells back to a default value. For example, the default parameter value may specify an interval in which neighbor call monitoring is performed for all neighbor cells at every tune away. By restoring the default frequency, the duration of each tune away period may also be restored to a default length of time.

In block 368, the mobile communication device may monitor neighbor cells according to the default frequency (as may be set in block 366) or the reduced frequency set in block 364. Neighbor cell monitoring may include the processor of the mobile communication device monitoring the transmit signal power of the neighbor cells to determine the top neighbor cells. Neighbor cell monitoring may also include decoding certain control channels of the top neighbor cells, such as the SCH, BCCH, and FCCH control channels of a GSM network subscription. By decoding such control channels of the top neighbor cells in advance, the mobile communication device may identify and synchronize to a neighbor cell more quickly during a reselection.

Thus, in response to the mobile communication device determining that a channel condition of the serving cell for the idle network subscription satisfies a threshold, the mobile communication device may reduce monitoring activities on neighbor cells. In other words, where the strength and/or quality of the signals received from the serving cell meet certain thresholds, the likelihood that reselection is necessary is not as high. Thus, the frequency at which neighbor cells are monitored for identifying candidates for cell reselection may be reduced. A benefit of such reduced neighbor cell monitoring activity in a single SIM mobile communication device may include improvements in the overall power consumption of the mobile communication device due to a corresponding reduction in the duration of the wake up periods. In the event the mobile communication device subsequently determines that the channel condition of the serving cell fails to satisfy the threshold, the mobile communication device may restore the default frequency at which neighbor cell monitoring activities are performed.

In determination block 370, the processor of the mobile communication device may determine whether the wake up operations have been completed or whether a timer associated with the tune away has expired. In response to determining that the wake up processing is complete, the processor may return the transmitter and receiver (or alternately, the transmitter and receiver portions of a transceiver) back to a low power standby state in the idle mode in block 352.

Figure 4A:
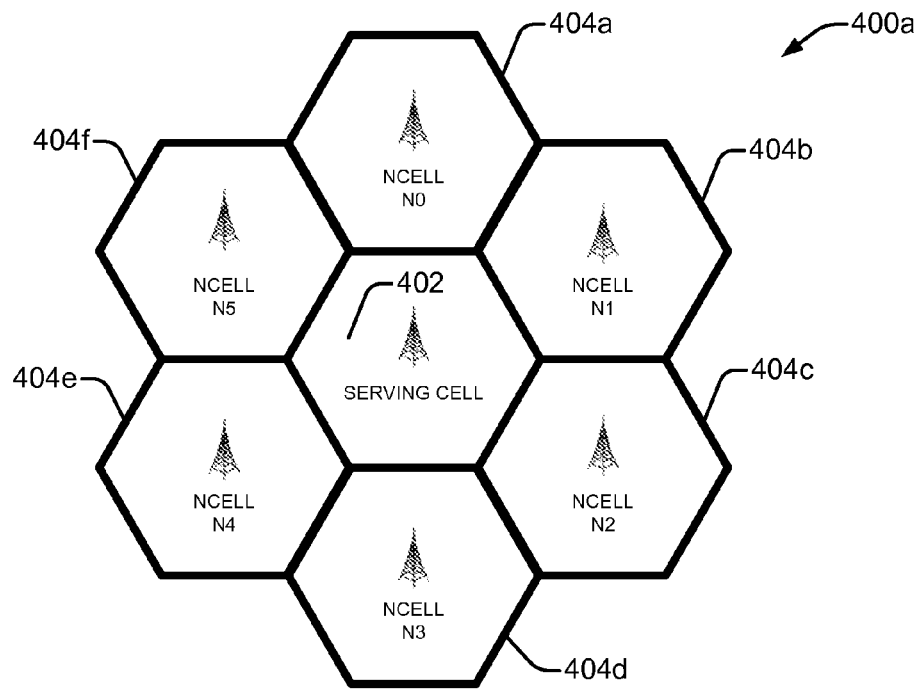
FIGS. 4A and 4B illustrate an example of reducing the number of neighbor cells monitoring during successive tune away or wake up processing according to some embodiments.
Figure 4B:
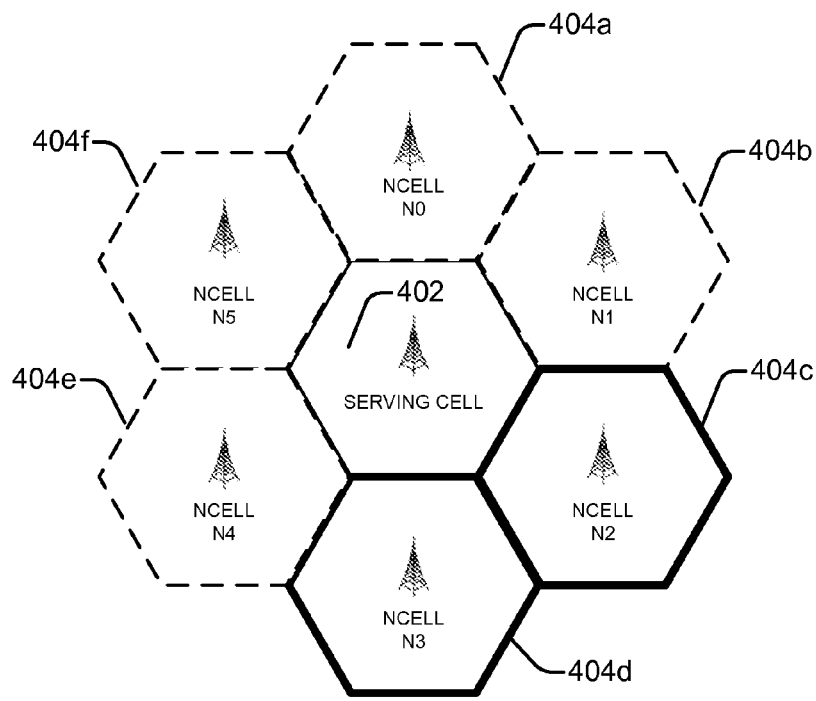

FIGS. 4A and 4B illustrate an example of reducing the number of neighbor cells monitoring during successive tune away or wake up processing according to some embodiments. With reference to FIGS. 1-4A, a default number of neighbor cells are selected for monitoring during a first tune away in a multi-SIM, multi-standby device or a first wake up in a single SIM device. In the example system 400a as shown, the top six (6) neighbor cells 404a, 404b, 404c, 404d, 404e, and 404f (collectively, 404) are selected for monitoring. In response to determining that a channel condition of the serving cell 402 satisfies the threshold, the default number of neighbor cells selected for monitoring may be reduced. For example, in FIG. 4B, the top two (2) neighbor cells, e.g., 404c and 404d, may be selected for monitoring during each tune away or wake up. The reduced number of neighbor cells that are monitored during successive tune away or wake up processing continue for successive tune away or wake up processing unless or until the default frequency at which the neighbor cells are monitored is restored. In this manner, the duration of each tune away or wake up may be reduced by at least an amount of time corresponding to the time it would have taken to perform the power monitors and/or decoding of the control channels of the other neighbor cells.

The actual number of neighbor cells associated with a particular serving cell depends on the coverage implemented by the mobile network carrier. For example, in some coverage areas, there may be upwards of 30 or more neighbor cells. In other coverage areas, there may be only one or two neighbor cells. Therefore, the default and reduced number of neighbor cells that are monitored during any particular tune away or wake up period may change depending on where in the coverage area the mobile communication device is operating.

Figure 5A:
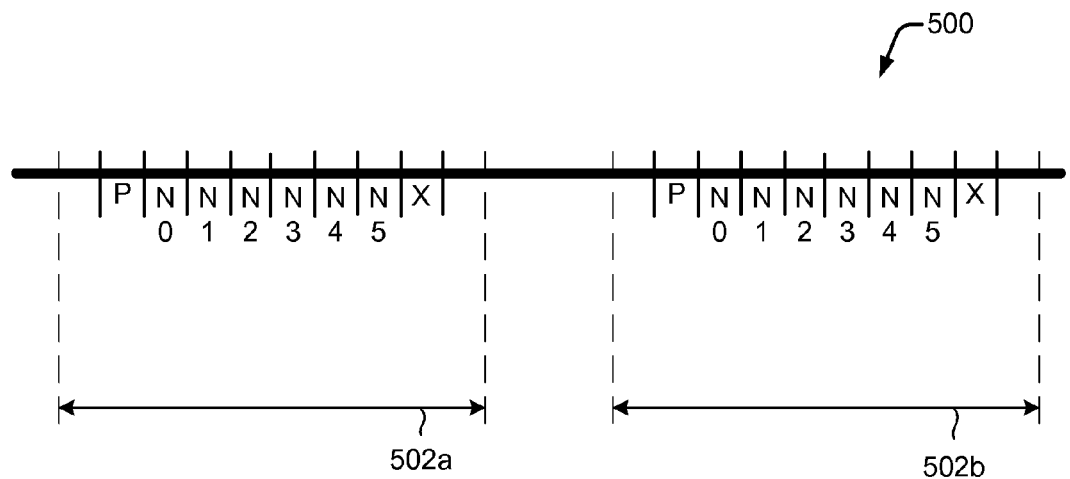
FIGS. 5A, 5B, and 5C are conceptual timelines comparing various embodiments for reducing neighbor cell monitoring to conventional monitoring.
Figure 5B:
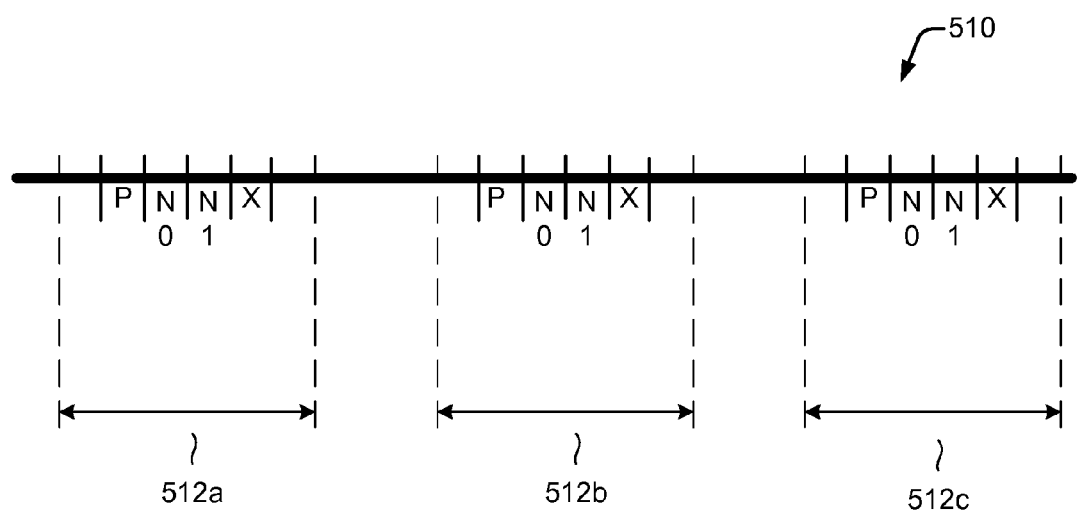
Figure 5C:
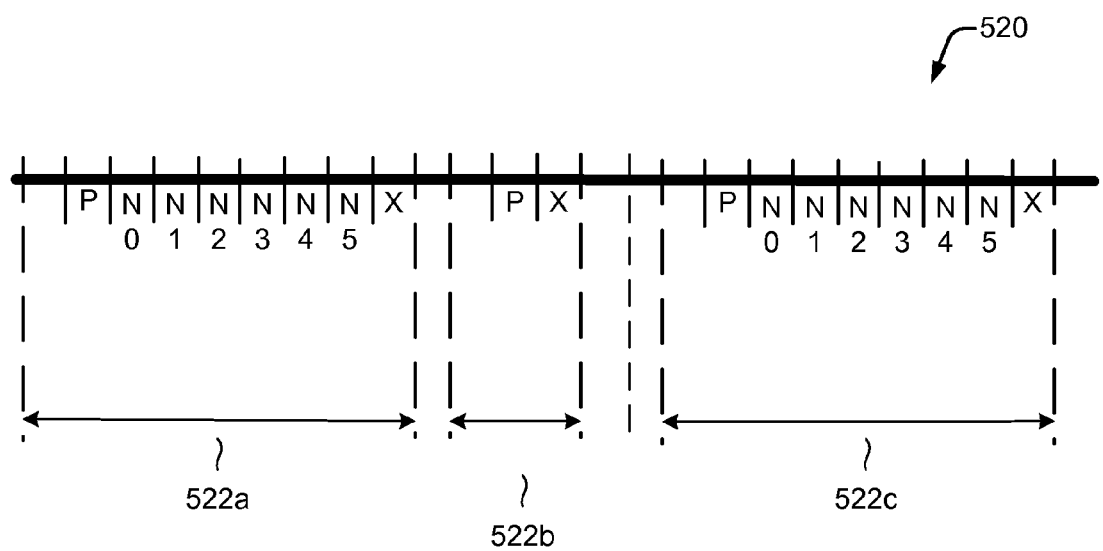

FIGS. 5A, 5B, and 5C are conceptual timelines comparing various embodiments for reducing neighbor cell monitoring to conventional monitoring. Specifically, FIG. 5A is a conceptual timeline 500 illustrating the timing of neighbor cell monitoring during successive tune away or wake up periods in a conventional manner. In this example, a mobile communication device (e.g. 100 in FIGS. 1-2B) tunes to the idle network subscription for periods 502a, 502b (collectively 502). As illustrated, during each period, the mobile communication device listens for paging signals during time segment P and monitors the top six neighbor cells during time segments N0 through N5. Additional tune away operations may also be performed during time segment X.

In contrast, FIGS. 5B and 5C are conceptual timelines 510 and 520, respectively, illustrating the timing of neighbor cell monitoring during successive tune away or wake up periods according to various embodiments. With reference to FIGS. 1-5C, for example, in the timeline 510, the mobile communication device listens for paging signals during respective paging segments P in each of the periods 512a, 512b, and 512c. However, instead of performing neighbor cell monitoring for all of the top six neighbor cells during each tune away, neighbor cell monitoring is performed for two of the top six neighbor cells during time segments N0 and N1 in each of the successive period 512a, 512b and 512c. Therefore, in comparison to the timeline 500, neighbor cell monitoring is performed on the top two strongest neighbor cells as opposed to the top six neighbor cells. As a result, the respective durations of each tune away or wake up period is reduced by an amount that corresponds to the time that it would have taken to monitor the four omitted neighbor cells.

In the timeline 520, the mobile communication device listens for paging signals during respective paging segments P in each of the tune away or wake up periods 522a, 522b, and 522c. However, instead of performing neighbor cell monitoring for all of the top six neighbor cells during every time, neighbor cell monitoring may be skipped for one or one periods. For example, as illustrated, all of the neighbor cells are monitored during the periods 522a and 522c with monitoring being skipped during the period 522b. Skipping neighbor cell monitoring for one or more tune aways or wake up periods for may be accomplished by increasing an interval between successive monitors. Thus, by skipping neighbor cell monitoring for one or more tune away periods, the duration of the skipped tune away periods may be reduced.

In some embodiments, the frequency of reducing the amount of neighbor cell monitoring activity may be accomplished by both increasing the intervals between successive neighbor cell monitors and reducing the number of neighbor cells that monitored at any one tune away.

Figure 6:
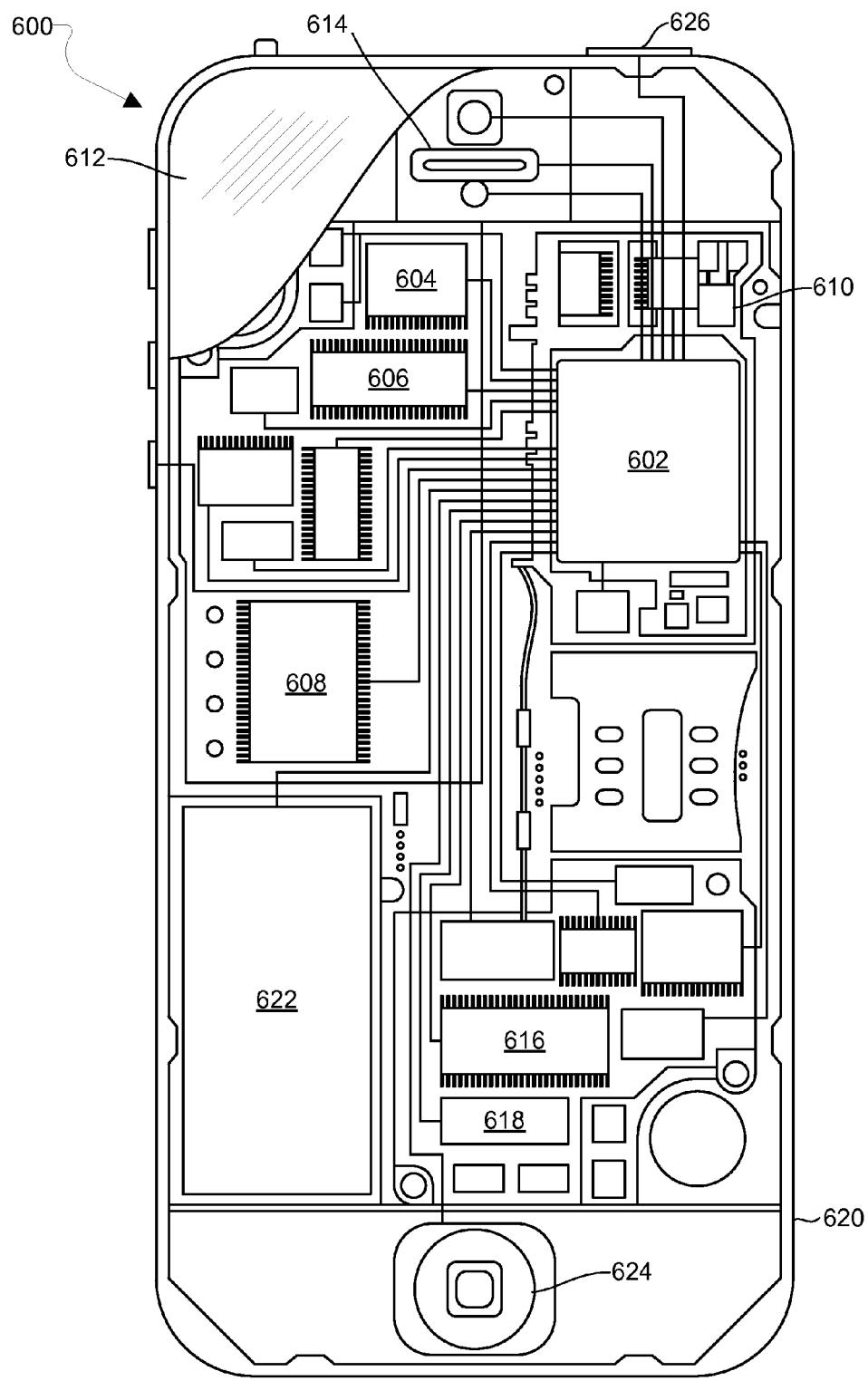
FIG. 6 is a component block diagram of a mobile communication device suitable for use in an embodiment.

FIG. 6 is a system block diagram of a smartphone type mobile communication device 600 suitable for use with various embodiments, including the embodiments of the methods 300 and 350 described with reference to FIGS. 3A and 3B. According to various embodiments, the communication device 600 may be similar to the mobile communication devices 100 as described with reference to FIGS. 1 and 2.

With reference to FIGS. 1-6, the mobile communication device 600 may include a processor 602 coupled to a touchscreen controller 604 and an internal memory 606. The processor 602 may be one or more multi-core integrated circuits designated for general or specific processing tasks. The internal memory 606 may be volatile or non-volatile memory. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the communication device 600 need not have touch screen capability. Additionally, the mobile communication device 600 may include a cellular network transceiver 608 coupled to the processor 602 and to an antenna 604 for sending and receiving electromagnetic radiation that may be connected to a wireless data link. The transceiver 608 and the antenna 610 may be used with the above-mentioned circuitry to implement various embodiment methods.

The mobile communication device 600 may have a cellular network transceiver 608 coupled to the processor 602 and to an antenna 610 and configured for sending and receiving cellular communications. The mobile communication device 600 may include one or more SIM cards 616, 618 coupled to the transceiver 608 and/or the processor 602 and may be configured as described above.

The mobile communication device 600 may also include speakers 614 for providing audio outputs. The mobile communication device 600 may also include a housing 620, constructed of a plastic, metal, or a combination of materials, for containing all or some of the components discussed herein. The mobile communication device 600 may include a power source 622 coupled to the processor 602, such as a disposable or rechargeable battery. The rechargeable battery may also be coupled to the peripheral device connection port to receive a charging current from a source external to the communication device 600. The communication device 600 may also include a physical button 624 for receiving user inputs. The mobile communication device 600 may also include a power button 626 for turning the mobile communication device 600 on and off.

Figure 7:
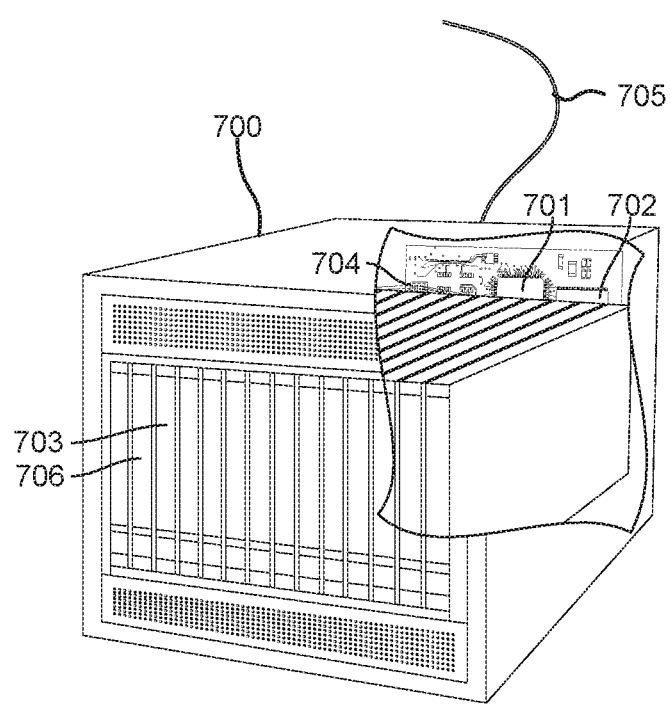
FIG. 7 is a component block diagram of a server device suitable for use in an embodiment.

The various embodiments may be implemented on any of a variety of commercially available server devices, such as the server 700 illustrated in FIG. 7. With reference to FIGS. 1-7, such a server 700 typically includes a processor 701 coupled to volatile memory 702 and a large capacity nonvolatile memory, such as a disk drive 703. The server 700 may also include a floppy disc drive, compact disc (CD) or DVD disc drive 706 coupled to the processor 701. The server 700 may also include network access ports 704 coupled to the processor 701 for establishing data connections with a network 705, such as a local area network coupled to other broadcast system computers and servers.

The processors 601, 701 may be any programmable microprocessor, microcomputer or multiple processor chip or chips that can be configured by software instructions (applications) to perform a variety of functions, including the functions of the various embodiments described below. In some mobile receiver devices, multiple processors 601 may be provided, such as one processor dedicated to wireless communication functions and one processor dedicated to running other applications. Typically, software applications may be stored in the internal memory 602, 702, 703 before they are accessed and loaded into the processor 601, 701. The processor 601, 701 may include internal memory sufficient to store the application software instructions.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The operations of a method or algorithm disclosed herein may be embodied in a processor-executable instructions such as a software module, which may reside on a non-transitory computer-readable storage medium. Non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the claims. Thus, the claims are not intended to be limited to the embodiments illustrated herein but are to be accorded the widest scope consistent with the principles and novel features disclosed herein.

What is claimed is:

1. A method for reducing neighbor cell monitoring by a mobile communication device, comprising:
   measuring, by a processor of the mobile communication device, a channel condition of a cell serving an idle network subscription;
   determining, by the processor, whether the measured channel condition of the cell serving the idle network subscription satisfies a threshold value; and
   in response to determining that the measured channel condition of the cell serving the idle network subscription satisfies the threshold value:

reducing, by the processor, a frequency at which neighbor cells associated with the idle network subscription are monitored; and monitoring, by the processor, the neighbor cells associated with the idle network subscription according to the reduced frequency.

2. The method of claim 1, wherein reducing a frequency at which the neighbor cells are monitored comprises setting, by the processor, a parameter value in memory that increases an interval between successive monitoring of the neighbor cells.

3. The method of claim 1, wherein reducing a frequency at which the neighbor cells are monitored comprises setting, by the processor, a parameter value in memory that reduces a default number of neighbor cells to periodically monitor.

4. The method of claim 1, further comprising:
determining, by the processor, whether the measured channel condition of the cell serving the idle network subscription satisfies the threshold value for a consecutive number of times that the channel condition is measured.

5. The method of claim 1, wherein measuring a channel condition of the cell serving the idle network subscription comprises measuring, by the processor, the channel condition on a paging channel of the cell serving the idle network subscription.

6. The method of claim 1, wherein the channel condition comprises at least one of a signal-to-noise ratio value and a receive signal strength indicator value.

7. The method of claim 1, further comprising:
in response to determining that the measured channel condition of the cell serving the idle network subscription fails to satisfy the threshold value:
restoring, by the processor, the frequency at which neighbor cells associated with the idle network subscription is monitored; and
monitoring, by the processor, the neighbor cells associated with the idle network subscription according to the restored frequency.

8. The method of claim 1,
wherein the mobile communication device is a multiple subscriber identity module (multi-SIM) multi-standby mobile communication device; and
the method further comprising:
periodically tuning away a transceiver, by the processor, from a first wireless network subscription to the idle network subscription for a tune away period.

9. The method of claim 8, further comprising:
reducing, by the processor, a duration of the tune away period by an amount of time corresponding to the reduced frequency at which the neighbor cells are monitored.

10. The method of claim 1,
wherein the mobile communication device is a single subscriber identity module (SIM) mobile communication device; and
the method further comprising:
periodically tuning a transceiver, by the processor, to the idle network subscription for a wake up period.

11. The method of claim 10, further comprising:
reducing, by the processor, a duration of the wake up period by an amount of time corresponding to the reduced frequency at which the neighbor cells are monitored.

12. A mobile communication device, comprising:
a memory;
a radio comprising a transceiver; and
a processor coupled to the memory and the radio, wherein the processor is configured with processor-executable instructions to cause the mobile communication device to:
measure a channel condition of a cell serving an idle network subscription;
determine whether the measured channel condition of the cell serving the idle network subscription satisfies a predefined threshold value; and
in response to determining that the measured channel condition of the cell serving the idle network subscription satisfies the threshold value:
reduce a frequency at which neighbor cells associated with the idle network subscription are monitored; and
monitor the neighbor cells associated with the idle network subscription according to the reduced frequency.

13. The mobile communication device of claim 12, wherein the processor is further configured with processor-executable instructions to reduce a frequency at which the neighbor cells are monitored by setting a parameter value in the memory that increases an interval between successive monitoring of the neighbor cells.

14. The mobile communication device of claim 12, wherein the processor is further configured with processor-executable instructions to reduce a frequency at which the neighbor cells are monitored by setting a parameter value in the memory that reduces a default number of neighbor cells to periodically monitor.

15. The mobile communication device of claim 12, wherein the processor is further configured with processor-executable instructions to determine whether the measured channel condition of the cell serving the idle network subscription satisfies the threshold value for a consecutive number of times that the channel condition is measured.

16. The mobile communication device of claim 12, wherein the processor is further configured with processor-executable instructions to measure the channel condition on a paging channel of the cell serving the idle network subscription.

17. The mobile communication device of claim 12, wherein the channel condition comprises at least one of a signal-to-noise ratio value and a receive signal strength indicator value.

18. The mobile communication device of claim 12 wherein the transceiver is a receiving portion of a single transceiver.

19. The mobile communication device of claim 12, wherein the processor is further configured with processor-executable instructions to cause the mobile communication device to:
in response to determining that the measured channel condition of the cell serving the idle network subscription fails to satisfy the threshold value:
restore the frequency at which neighbor cells associated with the idle network subscription are monitored; and
monitor the neighbor cells associated with the idle network subscription according to the restored frequency.

20. The mobile communication device of claim 12, wherein the mobile communication device is a multiple subscriber identity module (multi-SIM) multi-standby mobile communication device and the processor is further configured with processor-executable instructions to periodically tune away the transceiver from a first wireless network subscription to the idle network subscription for a tune away period.

21. The mobile communication device of claim 20, wherein the processor is further configured with processor-executable instructions to reduce a duration of the tune away period by an amount of time corresponding to the reduced frequency at which the neighbor cells are monitored.

22. The mobile communication device of claim 12, wherein the mobile communication device is a single subscriber identity module (SIM) mobile communication device and the processor is further configured with processor-executable instructions to periodically tune the transceiver to the idle network subscription for a wake up period.

23. The mobile communication device of claim 22, wherein the processor is further configured with processor-executable instructions to reduce a duration of the wake up period by an amount of time corresponding to the reduced frequency at which the neighbor cells are monitored.

24. A non-transitory processor-readable storage medium having stored thereon processor-executable instructions configured to cause a processor of a mobile communication device to perform operations, comprising:
    measure a channel condition of a cell serving an idle network subscription;
    determine whether the measured channel condition of the cell serving the idle network subscription satisfies a threshold value;
    in response to determining that the measured channel condition of the cell serving the idle network subscription satisfies the threshold value:
        reduce a frequency at which neighbor cells associated with the idle network subscription are monitored; and
        monitor the neighbor cells associated with the idle network subscription according to the reduced frequency.

25. The non-transitory processor-readable storage medium of claim 24, wherein the stored processor-executable instructions are configured to cause the processor to perform operations such that reducing a frequency at which the neighbor cells are monitored comprises setting a parameter value in memory that increases an interval between successive monitoring of the neighbor cells.

26. The non-transitory processor-readable storage medium of claim 24, wherein the stored processor-executable instructions are configured to cause the processor to perform operations such that reducing a frequency at which the neighbor cells are monitored comprises setting a parameter value in memory that reduces a default number of neighbor cells to periodically monitor.

27. The non-transitory processor-readable storage medium of claim 24, wherein the stored processor-executable instructions are configured to cause the processor to perform operations further comprising determining whether the measured channel condition of the cell serving the idle network subscription satisfies the threshold value for a consecutive number of times that the channel condition is measured.

28. The non-transitory processor-readable storage medium of claim 24, wherein the stored processor-executable instructions are configured to cause the processor to perform operations such that measuring a channel condition of the cell serving the idle network subscription comprises measuring the channel condition on a paging channel of the cell serving the idle network subscription.

29. The non-transitory processor-readable storage medium of claim 24, wherein the channel condition comprises at least one of a signal-to-noise ratio value and a receive signal strength indicator value.

30. A mobile communication device, comprising:
    means for measuring a channel condition of a cell serving an idle network subscription;
    means for determining whether the measured channel condition of the cell serving the idle network subscription satisfies a threshold value;
    means for reducing a frequency at which neighbor cells associated with the idle network subscription are monitored in response to determining that the channel condition of the cell serving the idle network subscription satisfies the threshold value; and
    means for monitoring the neighbor cells associated with the idle network subscription according to the reduced frequency.

* * * * *